(12) United States Patent
Jia et al.

(10) Patent No.: US 11,430,413 B2
(45) Date of Patent: Aug. 30, 2022

(54) METHOD, DEVICE, AND COMPUTER PROGRAM PRODUCT FOR MANAGING VIRTUAL VISUAL CONTENT

(71) Applicant: EMC IP Holding Company LLC, Hopkinton, MA (US)

(72) Inventors: Zhen Jia, Shanghai (CN); Danqing Sha, Shanghai (CN); Bin He, Shanghai (CN); Xuwei Tang, Nanjing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/079,632

(22) Filed: Oct. 26, 2020

(65) Prior Publication Data

US 2022/0101813 A1 Mar. 31, 2022

(30) Foreign Application Priority Data

Sep. 30, 2020 (CN) .......................... 202011056325.3

(51) Int. Cl.
*G09G 5/37* (2006.01)
*G06F 3/01* (2006.01)
(Continued)

(52) U.S. Cl.
CPC ............... *G09G 5/37* (2013.01); *G06F 3/012* (2013.01); *G06F 3/013* (2013.01); *G06T 7/194* (2017.01);
(Continued)

(58) Field of Classification Search
CPC ............... G09G 5/37; G09G 2320/106; G09G 2320/103; G09G 2370/022;
(Continued)

(56) References Cited

U.S. PATENT DOCUMENTS 7,219,364 B2 * 5/2007 Bolle ..................... H04N 19/00
375/E7.026
10,818,068 B2 * 10/2020 Babatunde ............... G06T 1/20
(Continued)

FOREIGN PATENT DOCUMENTS

KR 20190106306 A 9/2019

OTHER PUBLICATIONS

M. Chen et al., "Spatiotemporal GMM for Background Subtraction with Superpixel Hierarchy," IEEE Transactions on Pattern Analysis and Machine Intelligence, vol. 40, No. 6, Jun. 2018, 8 pages.
(Continued)

*Primary Examiner* — William Boddie
*Assistant Examiner* — Bipin Gyawali
(74) *Attorney, Agent, or Firm* — Ryan, Mason & Lewis, LLP

(57) ABSTRACT

Embodiments of the present disclosure relate to a method, a device, and a computer program product for managing virtual visual content. A method for managing virtual visual content is provided, which includes: determining a plurality of content portions from virtual visual content that is to be interacted with a user, the plurality of content portions having different change frequencies in the interaction; and transmitting, based on the change frequencies, the plurality of content portions to a plurality of computing devices having different proximities to the user, respectively. Through the embodiments of the present disclosure, the delay of a user interacting with virtual visual content can be reduced.

20 Claims, 6 Drawing Sheets

(51) Int. Cl.
    *G06T 7/20*     (2017.01)
    *G06T 7/194*     (2017.01)
    *H04B 1/3827*     (2015.01)
    *H04L 67/10*     (2022.01)
    *G06K 9/62*     (2022.01)

(52) U.S. Cl.
    CPC ............ *G06T 7/20* (2013.01); *G06K 9/6267* (2013.01); *G06T 2207/20081* (2013.01); *G09G 2320/0252* (2013.01); *G09G 2320/043* (2013.01); *G09G 2320/103* (2013.01); *G09G 2320/106* (2013.01); *G09G 2340/14* (2013.01); *G09G 2350/00* (2013.01); *G09G 2354/00* (2013.01); *G09G 2370/022* (2013.01); *H04B 1/3827* (2013.01); *H04L 67/10* (2013.01)

(58) Field of Classification Search
    CPC ....... G09G 2320/0252; G09G 2352/00; G09G 2350/00; G06T 7/194; G06T 7/20
    See application file for complete search history.

(56) References Cited

U.S. PATENT DOCUMENTS

| | | | |
|---|---|---|---|
| 11,032,590 | B2 | 6/2021 | Shi et al. |
| 2002/0091792 | A1 | 7/2002 | Janniello et al. |
| 2003/0140088 | A1 | 7/2003 | Robinson et al. |
| 2009/0138544 | A1* | 5/2009 | Wegenkittl ............ G06F 9/5083 709/203 |
| 2010/0323715 | A1 | 12/2010 | Winters |
| 2011/0276653 | A1* | 11/2011 | Matsui .................. H04N 19/61 709/217 |
| 2014/0304750 | A1 | 10/2014 | Lemmey et al. |
| 2015/0343306 | A1* | 12/2015 | Bentdahl ............... A63F 13/323 463/31 |
| 2018/0270531 | A1 | 9/2018 | Ye et al. |
| 2018/0288392 | A1* | 10/2018 | Hicks ..................... G09G 5/001 |
| 2019/0235729 | A1* | 8/2019 | Day ...................... G06F 3/0485 |
| 2020/0077124 | A1 | 3/2020 | Shi et al. |
| 2020/0366899 | A1* | 11/2020 | Fitzgerald ............ H04N 19/146 |
| 2020/0382896 | A1* | 12/2020 | Eronen .................. H04S 7/304 |

OTHER PUBLICATIONS

J. Huang et al., "An Efficient Optical Flow Based Motion Detection Method for Non-stationary Scenes," 2019 IEEE Chinese Control and Decision Conference (CCDC), Jun. 3-5, 2019, pp. 5272-5277.
J. Redmon et al., "You Only Look Once: Unified, Real-Time Object Detection," 2016 IEEE Conference on Computer Vision and Pattern Recognitions (CVPR), Jun. 27-30, 2016, 10 pages.
International Search Report and Written Opinion of PCT/US2021/029534, dated Oct. 12, 2021, 12 pages.
Linux Foundation, "Akraino—LF Edge," https://www.lfedge.org/projects/akraino/, Accessed Sep. 28, 2020, 4 pages.

* cited by examiner

METHOD, DEVICE, AND COMPUTER PROGRAM PRODUCT FOR MANAGING VIRTUAL VISUAL CONTENT

RELATED APPLICATION(S)

The present application claims priority to Chinese Patent Application No. 202011056325.3, Sep. 30, 2020, and entitled "Method, Device, and Computer Program Product for Managing Virtual Visual Content," which is incorporated by reference herein in its entirety.

FIELD

Embodiments of the present disclosure generally relate to the field of information processing, and in particular, to a method, a device, and a computer program product for managing virtual visual content.

BACKGROUND

The presentation of virtual visual content can bring a rich and vivid experience to people. A virtual visual content presentation technology is computationally intensive, which requires powerful processing capabilities and sufficient storage space. Some conventional solutions enable processing in the virtual visual content presentation technology to be performed at computationally powerful devices remote from user equipment for viewing virtual visual content. However, such solutions tend to result in increased delays in user interaction with the virtual visual content.

In order to reduce the delay, other conventional solutions integrate the processing in the virtual visual content presentation technology on the user equipment for viewing the virtual visual content as much as possible. However, such solutions not only make a content viewing device of a user expensive and oversized, but also cause the content viewing device to overheat and to have a shortened service life due to an excessive load.

SUMMARY

Illustrative embodiments of the present disclosure provide a method, a device, and a computer program product for managing virtual visual content.

In a first aspect of the present disclosure, a method for managing virtual visual content is provided. The method includes: determining a plurality of content portions from virtual visual content that is to be interacted with a user, the plurality of content portions having different change frequencies in the interaction; and transmitting, based on the change frequencies, the plurality of content portions to a plurality of computing devices having different proximities to the user, respectively.

In a second aspect of the present disclosure, an electronic device is provided. The device includes: at least one processing unit; and at least one memory coupled to the at least one processing unit and storing instructions configured to be executed by the at least one processing unit. The instructions, when executed by the at least one processing unit, cause the device to perform actions including: determining a plurality of content portions from virtual visual content that is to be interacted with a user, the plurality of content portions having different change frequencies in the interaction; and transmitting, based on the change frequencies, the plurality of content portions to a plurality of computing devices having different proximities to the user, respectively.

In a third aspect of the present disclosure, a computer program product is provided. The computer program product is tangibly stored in a non-transitory computer storage medium and includes machine-executable instructions. The machine-executable instructions, when executed by a device, cause this device to implement any step of the method described according to the first aspect of the present disclosure.

This Summary is provided to introduce the choice of concepts in a simplified form, which will be further described in the following Detailed Description. The Summary is neither intended to identify important features or essential features of the present disclosure, nor intended to limit the scope of the present disclosure.

BRIEF DESCRIPTION OF THE DRAWINGS

The above and other objectives, features, and advantages of the present disclosure will become more apparent from the following detailed description of example embodiments in combination with the accompanying drawings. In the example embodiments of the present disclosure, the same reference numerals generally represent the same parts.

In the accompanying drawings, the same or corresponding numerals represent the same or corresponding parts.

DETAILED DESCRIPTION

Figure 1:
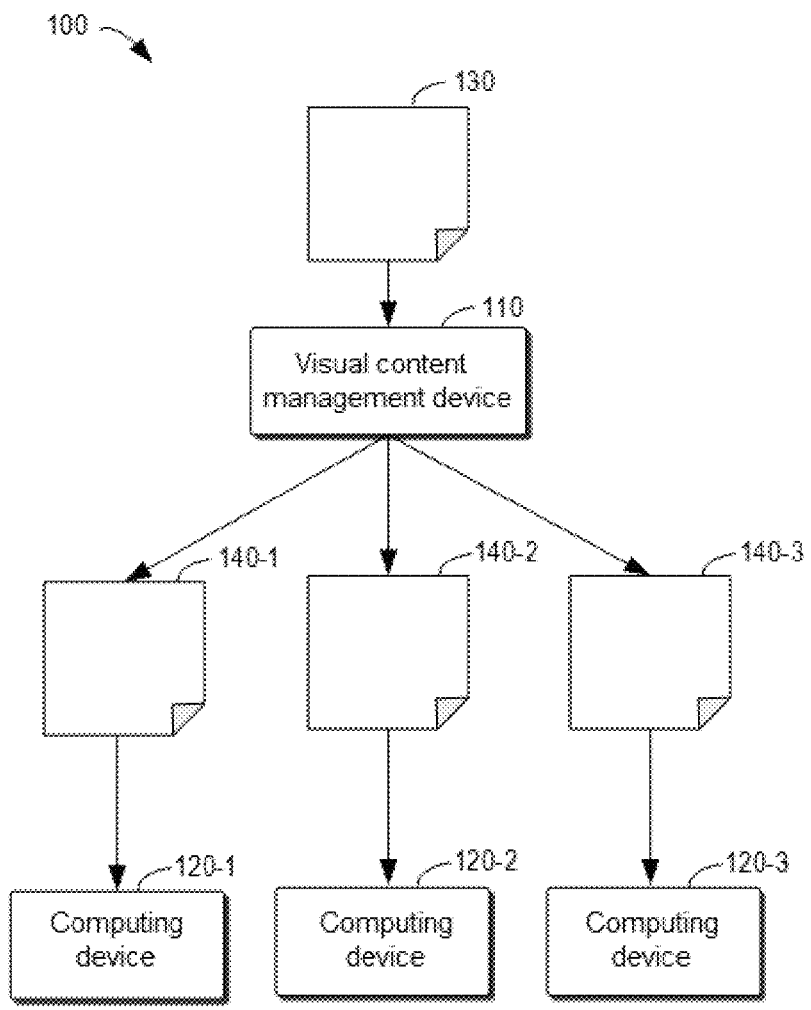
FIG. 1 shows a block diagram of an example visual content management system in which an embodiment of the present disclosure can be implemented.

Illustrative embodiments of the present disclosure will be described in more detail below with reference to the accompanying drawings. Although the illustrative embodiments of the present disclosure are shown in the accompanying drawings, it should be understood that the present disclosure can be implemented in various forms and should not be limited by the embodiments set forth herein. Rather, these embodiments are provided to make the present disclosure more thorough and complete and to fully convey the scope of the present disclosure to those skilled in the art.

The term "include" and its variants as used herein indicate open-ended inclusion, that is, "including, but not limited to." Unless specifically stated, the term "or" indicates "and/or." The term "based on" indicates "based at least in part on." The terms "an example embodiment" and "an embodiment"

indicate "at least one example embodiment." The term "another embodiment" indicates "at least one additional embodiment." The terms "first," "second," and the like may refer to different or identical objects. Other explicit and implicit definitions may also be included below.

As mentioned above, the presentation of virtual visual content can bring a rich and vivid experience to people. For example, Augmented Reality (AR) can integrate virtual information with the real world, so that people get an enhanced experience of the real world. Virtual Reality (VR) can provide an immersive virtual environment experience to people. With the development of technology, a virtual visual content presentation technology is applied in various industries.

The virtual visual content presentation technology such as AR and VR is computationally intensive, which requires powerful processing capabilities and sufficient storage space. Some conventional solutions enable processing in the virtual visual content presentation technology to be performed at computationally powerful devices remote from content viewing devices of users. However, such solutions tend to result in increased delays in user interaction with the virtual visual content. Since human beings are very sensitive to the delay of virtual visual content, a too large delay will cause disorientation and nausea for users viewing virtual visual content. Therefore, the virtual visual content presentation technology must meet higher delay requirements. Generally speaking, an acceptable delay is within 5 milliseconds. Once the delay requirement is not met, users will feel uncomfortable, which greatly reduces user satisfaction.

In order to reduce the delay, other conventional solutions integrate the processing in the virtual visual content presentation technology on content viewing devices for viewing the virtual visual content as much as possible. The content viewing devices are, for example, AR/VR headsets, AR glasses, etc. However, because the virtual visual content presentation technology is computationally intensive, integrating the virtual visual content presentation technology on the content viewing device not only makes the content viewing device expensive and oversized, but also causes the content viewing device to overheat and to have a shortened service life due to an excessive load.

Illustrative embodiments of the present disclosure provide a solution for managing virtual visual content, so as to solve the above problems and one or more of other potential problems. The solution determines a plurality of content portions having different change frequencies in the interaction from virtual visual content that is to be interacted with a user, and transmits, according to the change frequencies, the plurality of content portions to a plurality of computing devices having different proximities to the user, respectively. Through such a solution, the delay in the interaction between the user and the virtual visual content can be effectively reduced.

FIG. 1 shows a block diagram of example visual content management system 100 in which an embodiment of the present disclosure can be implemented. As shown in FIG. 1, visual content management system 100 includes visual content management device 110 and computing devices 120-1 to 120-3 (collectively referred to as computing device 120). Various methods according to the embodiments of the present disclosure may be implemented at an electronic device such as visual content management device 110.

As shown in FIG. 1, visual content management device 110 may determine a plurality of content portions 140-1 to 140-3 (collectively referred to as content portion 140) from virtual visual content 130 that is to be interacted with a user. The plurality of content portions 140-1 to 140-3 have different change frequencies in this interaction. Visual content management device 110 may transmit the plurality of content portions 140-1 to 140-3 to the plurality of computing devices 120-1 to 120-3 having different proximities to the user, respectively.

Visual content management device 110 may be, for example, a computer, a virtual machine, a server, a cloud computing device, etc. The plurality of computing devices 120 may be devices that have different proximities to the user. Herein, "proximity" may refer to the degree of proximity in spatial distance, or the speed of transmitting visual content. Having different proximities to the user means that the delays required for the user to interact with the virtual visual content are different. Additionally, the plurality of computing devices 120 may be devices having different processing capabilities. For example, in some embodiments, computing device 120 may be an AR/VR content viewing device. The AR/VR content viewing device may be a smart phone, a smart tablet, a smart wearable device, an independent AR/VR headset, independent AR glasses, etc. Alternatively or additionally, in some embodiments, computing device 120 may be an edge server. Alternatively or additionally, in some embodiments, computing device 120 may be a cloud computing device. Visual content management device 110 and computing device 120 may be connected to each other through a network. The network may be the Internet, intranet, etc. The present disclosure is not limited in this regard.

It should be understood that the structure of visual content management system 100 is described for exemplary purposes only, and does not imply any limitation on the scope of the present disclosure. For example, the embodiments of the present disclosure may also be applied to a system different from visual content management system 100. It should be understood that the specific number of the above devices, virtual visual content, and content portions is given for illustrative purposes only, and does not imply any limitation to the scope of the present disclosure.

Figure 2:
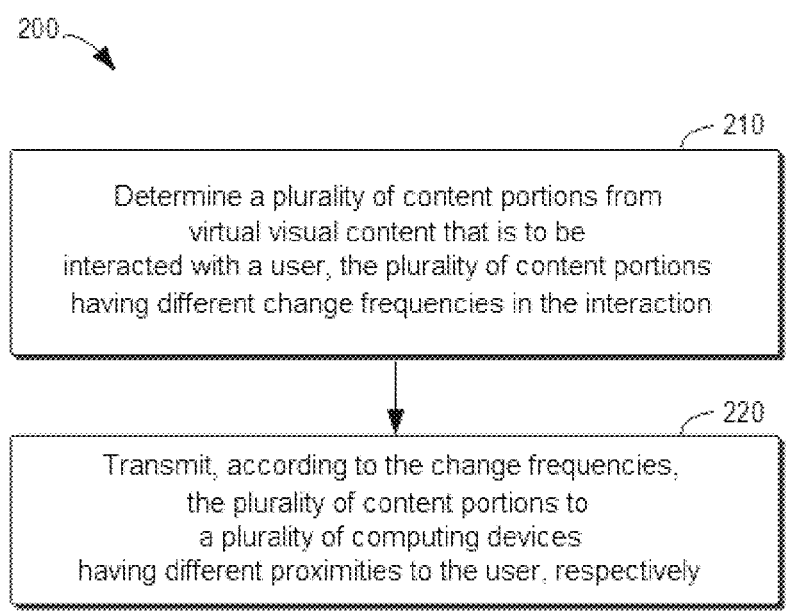
FIG. 2 shows a flowchart of an example method for managing virtual visual content according to an embodiment of the present disclosure.

FIG. 2 shows a flowchart of example method 200 for managing virtual visual content according to an embodiment of the present disclosure. For example, method 200 may be performed by visual content management device 110 shown in FIG. 1. It should be understood that method 200 may also be performed by other devices, and the scope of the present disclosure is not limited in this regard. It should also be understood that method 200 may also include additional actions not shown and/or omit the actions shown, and the scope of the present disclosure is not limited in this regard.

At 210, visual content management device 110 determines a plurality of content portions 140 from virtual visual content 130 that is to be interacted with a user. The plurality of content portions 140 have different change frequencies in this interaction. Virtual visual content 130 that is to be interacted with the user may be obtained by visual content management device 110 from a virtual visual content library. In some embodiments, the virtual visual content library may be located in visual content management device 110. Additionally or alternatively, in some embodiments, the virtual visual content library may be located in a device separate from visual content management device 110.

Generally, virtual visual content 130 includes content portions 140 that have different change frequencies in interaction. In some embodiments, virtual visual content 130 may include content portions that hardly change in interaction with the user. These content portions may be constant or may change with a very low frequency. For example, in a scene where virtual visual content 130 is an indoor home, these content portions may be indoor floors and walls, outdoor scenery, etc. Additionally or alternatively, in some embodiments, virtual visual content 130 may include content portions that change moderately in the interaction with the user. For example, these content portions may be moving people, changing light, etc. Additionally or alternatively, in some embodiments, virtual visual content 130 may include content portions that change frequently in the interaction with the user. For example, these content portions may be buttons, doors, selection panels or switches, etc., and the user may interact with these content portions to change the presented virtual visual content.

Visual content management device 110 may determine a plurality of content portions 140 having different change frequencies from virtual visual content 130 through various methods such as computer vision and machine learning. In some embodiments, visual content management device 110 may determine a static content portion and a dynamic content portion from virtual visual content 130. The change frequency of the dynamic content portion is higher than that of the static content portion. Additionally, in some embodiments, visual content management device 110 may determine a first dynamic content portion and a second dynamic content portion from the dynamic content portion. The change frequency of the second dynamic content portion is higher than that of the first dynamic content portion. The details of determining the plurality of content portions 140 from virtual visual content 130 will be described in detail below with reference to FIGS. 3, 4A, and 4B.

After determining the plurality of content portions 140, at 220, visual content management device 110 transmits, according to the change frequencies, the plurality of content portions 140 to a plurality of computing devices 120 having different proximities to the user, respectively.

Having different proximities to the user means that the delays required for the user to interact with the virtual visual content are different. The content portion having a low change frequency does not need to be updated frequently, so it may be processed by a computing device not in relatively close proximity to the user, which does not cause an unacceptable transmission delay. On the contrary, the content portion having a higher change frequency may be processed by a computing device in relatively close proximity to the user, thereby ensuring that the transmission delay of visual content is within an acceptable range. Therefore, visual content management device 110 may transmit content portions having a low change frequency in the plurality of content portions 140 to a computing device that is not in relatively close proximity to the user, and transmit content portions having a high change frequency in the plurality of content portions 140 to a computing device that is in relatively close proximity to the user.

In some embodiments, computing device 120 may be an AR/VR content viewing device. The AR/VR content viewing device may be a smart phone, a smart tablet, a smart wearable device, an independent AR/VR headset, independent AR glasses, etc. Alternatively or additionally, in some embodiments, computing device 120 may be an edge server. Alternatively or additionally, in some embodiments, computing device 120 may be a cloud computing device.

In addition, since the content portion having a low change frequency often contains many details and needs to be processed by a computing device having powerful computing capability, visual content management device 110 may transmit the content portion to a computationally powerful device not in relatively close proximity to the user for processing.

For example, if virtual visual content 130 includes a static content portion having a low change frequency and a dynamic content portion having a high change frequency and computing devices 120 include an AR/VR content viewing device in relatively close proximity to the user and a cloud computing device not in relatively close proximity to the user, visual content management device 110 may transmit the static content portion to the cloud computing device and the dynamic content portion to the AR/VR content viewing device.

Similarly, if virtual visual content 130 includes a static content portion, a first dynamic content portion, and a second dynamic content portion, which are sequentially arranged in an ascending order of change frequencies, and computing devices 120 include an AR/VR content viewing device, an edge server, and a cloud computing device, which are sequentially arranged in an order of decreasing relative proximities to the user, visual content management device 110 may transmit the static content portion to the cloud computing device, transmit the first dynamic content portion to the edge server, and transmit the second dynamic content portion to the AR/VR content viewing device.

As mentioned above, it is advantageous to manage virtual visual content in this way. The content portion having a higher change frequency is processed by a computing device having relatively close proximity to the user, thereby ensuring that the transmission delay of visual content is within an acceptable range. The content portion having a low change frequency does not need to be updated frequently, so it is processed by a computing device not having relatively close proximity to the user, which does not cause an unacceptable transmission delay.

In addition, the content portion having a low change frequency is transmitted to a computationally powerful computing device not in relatively close proximity to the user for processing, and a local computing device in relatively close proximity to the user may be unloaded, thereby reducing the cost and size of the local computing device and prolonging the service life of the local computing device.

In the above example embodiment, a plurality of content portions having different change frequencies in interaction are determined from virtual visual content that is to be interacted with a user, and the plurality of content portions are transmitted to a plurality of computing devices having different proximities to the user according to the change frequencies respectively, which not only can reduce the delay of user interaction with the virtual visual content, but also can reduce the cost and size of user equipment for viewing virtual visual content and prolong the service life of the user equipment.

Figure 3:
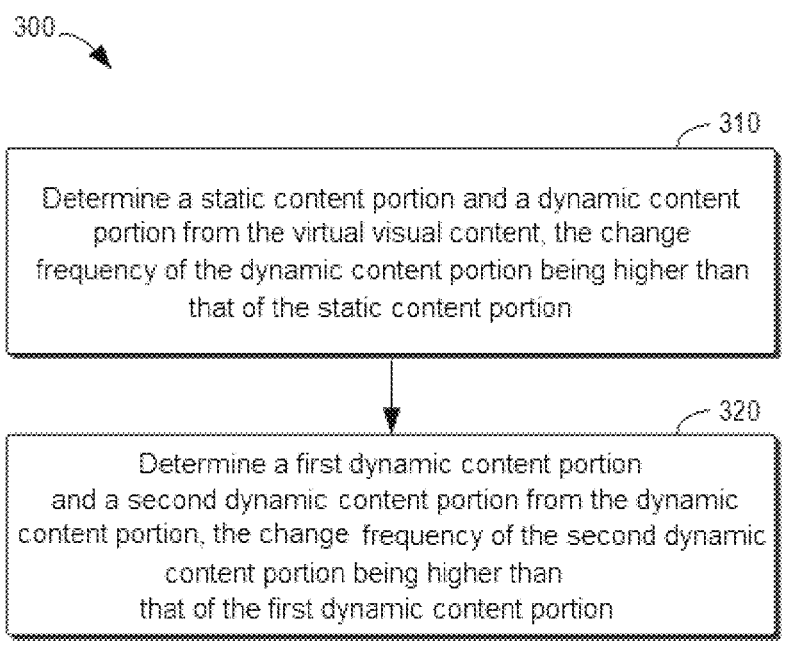
FIG. 3 shows a flowchart of an example method for determining a plurality of content portions from a virtual visual content portion according to an embodiment of the present disclosure.

FIG. 3 shows a flowchart of example method 300 for determining a plurality of content portions from a virtual visual content portion according to an embodiment of the present disclosure. For example, method 300 may be performed by visual content management device 110 shown in FIG. 1. Method 300 is an embodiment of 210 in method 200. It should be understood that method 300 may also be executed by other devices. The scope of the present disclosure is not limited in this regard. It should be further understood that method 300 may further include additional actions that are not shown and/or may skip actions that are shown. The scope of the present disclosure is not limited in this regard.

At 310, visual content management device 110 determines a static content portion and a dynamic content portion from virtual visual content 130. The change frequency of the dynamic content portion is higher than that of the static content portion. Visual content management device 110 may determine a static content portion and a dynamic content portion from virtual visual content 130 through various methods such as computer vision and machine learning, so as to provide different content portions to computing devices having different proximities to a user.

For example, in some embodiments, visual content management device 110 may apply background subtraction to virtual visual content 130 so as to determine a first content portion and a second content portion from the dynamic content portion. The change frequency of the second content portion is higher than that of the first content portion. The background subtraction is a classic computer vision method for separating background objects from foreground objects. The background subtraction is, for example, background subtraction based on a Gaussian mixture model. For a detailed description of the example background subtraction method, reference may be made to the following document: M. Chen et al. "Spatiotemporal GMM for Background Subtraction with Superpixel Hierarchy," IEEE Transactions on Pattern Analysis and Machine Intelligence, Vol. 40, Issue 6, Jun. 1, 2018, pp. 1518-1525. In embodiments of the present disclosure, a background object may correspond to the first content portion, and a foreground object may correspond to the second content portion. After determining the first content portion and the second content portion from virtual visual content 130, visual content management device 110 may determine the first content portion and the second content portion as a static content portion and a dynamic content portion, respectively.

Alternatively or additionally, in some embodiments, visual content management device 110 may apply a motion detection method to virtual visual content 130 so as to determine a first content portion and a second content portion from the dynamic content portion. The change frequency of the second content portion is higher than that of the first content portion. For example, visual content management device 110 may use an optical flow-based motion detection method to detect moving objects in virtual visual content 130. For a detailed description of the example motion detection method, reference may be made to the following document: J. Huang et al., "An Efficient Optical Flow Based Motion Detection Method for Non-Stationary Scenes," 2019 IEEE Chinese Control and Decision Conference (CCDC), June 2019, pp. 5272-5277.

Figure 4A:
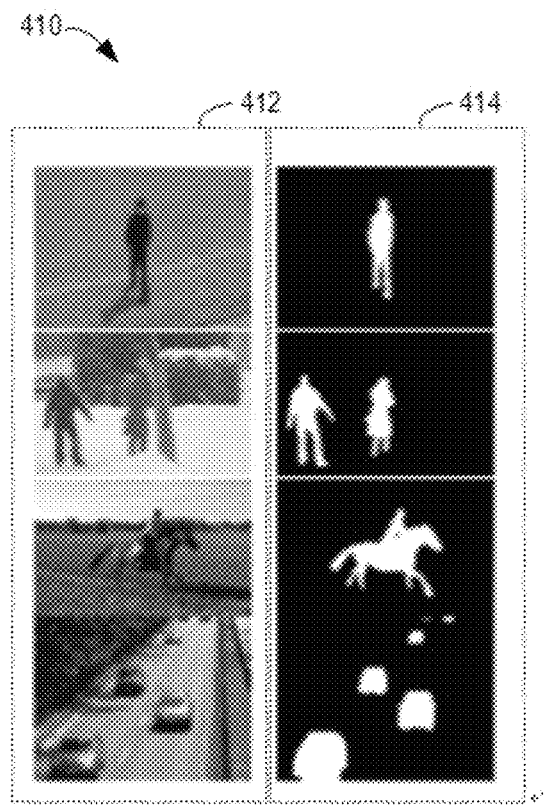
FIG. 4A shows a schematic diagram of a result of applying a background subtraction or motion detection method to virtual visual content according to an embodiment of the present disclosure.

The result of the background subtraction or motion detection method is described below with reference to FIG. 4A. FIG. 4A shows schematic diagram 410 of a result of applying a background subtraction or motion detection method to virtual visual content according to an embodiment of the present disclosure. As shown in FIG. 4A, applying a background subtraction or motion detection method to virtual visual content 412 will result in a processed virtual visual content 414. In the processed virtual visual content 414, a black area indicates a background object area, and a white area indicates a foreground object area. In this case, visual content management device 110 may determine a content portion corresponding to the black area as a static content portion, and a content portion corresponding to the white area as a dynamic content portion.

Alternatively or additionally, in some embodiments, visual content management device 110 may apply machine learning-based object detection to virtual visual content 130 so as to determine a first content portion and a second content portion from the dynamic content portion. The change frequency of the second content portion is higher than that of the first content portion. For example, visual content management device 110 may apply a trained machine learning model or deep learning model to an input image including a foreground object and a background object to detect the foreground object from the input image. For a detailed description of the example machine learning-based object detection method, reference may be made to the following document: Joseph Redmon et al., "You Only Look Once: Unified, Real-Time Object Detection," 2016 IEEE Conference on Computer Vision and Pattern Recognitions (CVPR), June 2016.

Figure 4B:
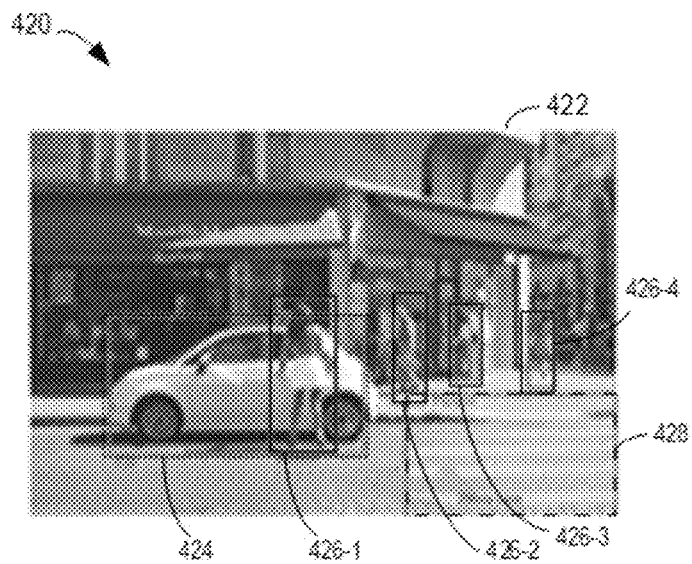
FIG. 4B shows a schematic diagram of a result of applying a machine learning-based object detection method to virtual visual content according to an embodiment of the present disclosure.

The result of the object detection method is described below with reference to FIG. 4B. FIG. 4B shows schematic diagram 420 of a result of applying a machine learning-based object detection method to virtual visual content according to an embodiment of the present disclosure. As shown in FIG. 4B, applying a machine learning-based object detection method to virtual visual content 422 will result in foreground objects 424, 426, and 428 of different categories. Foreground object 424 belongs to a vehicle category, foreground objects 426-1 to 426-4 belong to a person category, and foreground object 428 belongs to a striped crossing category. In this case, visual content management device 110 may determine foreground objects 424, 426, and 428 as dynamic content portions, and determine the remaining content portions in virtual visual content 422 as static content portions.

At 320, visual content management device 110 determines a first dynamic content portion and a second dynamic content portion from the dynamic content portion. The change frequency of the second dynamic content portion is higher than that of the first dynamic content portion.

In some embodiments, visual content management device 110 may apply the above-described method for determining the static content portion and the dynamic content portion from virtual visual content 130 to the dynamic content portion again, thereby determining the first dynamic content portion and the second dynamic content portion from the dynamic content portion. Further dividing the dynamic content portion enables the dynamic content portion to be further refined into content portions having different change frequencies, so that the dynamic content portion is also transmitted to different devices for processing, thereby further reducing the delay of interaction with the user, and further reducing the load of user equipment for viewing virtual visual content.

Alternatively or additionally, in some embodiments, visual content management device 110 may determine change frequency statistics on the dynamic content portion, and then determine a content portion having a low change frequency according to the statistics as the first dynamic content portion and a content portion having a high change frequency according to the statistics as the second dynamic content portion. It is easy to understand that different virtual visual content has different characteristics, so it is also suitable for different content portion division methods. Some virtual visual content can be well separated into content portions having different change frequencies using statistics. For such virtual visual content, a statistical method may be used to determine the first dynamic content portion and the second dynamic content portion.

Alternatively or additionally, in some embodiments, visual content management device 110 may use a sensor of an AR/VR device worn by a user when viewing historical visual content to obtain motion information of the user, and then determine a visual focus area of the user based on the motion information. Visual content management device 110 may determine a content portion corresponding to the visual focus area in the dynamic content portion as the second dynamic content portion. Alternatively, in some embodiments, visual content management device 110 may directly obtain the determined visual focus area from the AR/VR device or a local storage library. The motion information of the user may be eyeball motion information of the user. Additionally or alternatively, the motion information of the user may also be head motion information of the user. Such a content portion division method may take visual focus area information of the user into consideration. Since the visual focus area often corresponds to a content portion having a high change frequency, such a content portion division method improves the efficiency and accuracy of content portion division.

Alternatively or additionally, in some embodiments, visual content management device 110 may determine the first dynamic content portion and the second dynamic content portion according to pre-configured labels. For example, some virtual visual content may be manually marked with labels respectively corresponding to the first dynamic content portion and the second dynamic content portion according to the experience of experts. In this case, visual content management device 110 may directly determine the first dynamic content portion and the second dynamic content portion according to the labels. Such a content portion division method may benefit from the experience of experts, thereby improving the accuracy of content portion division.

It should be understood that some computer vision and machine learning methods are shown for illustrative purposes only, and do not imply any limitation to the scope of the present disclosure. For example, other computer vision and machine learning methods may also be used to determine a plurality of content portions from the virtual visual content. The present disclosure is not limited in this regard.

In the above example embodiment, a static content portion and a dynamic content portion are determined from virtual visual content, and a first dynamic content portion and a second dynamic content portion are determined from the dynamic content portion. The virtual visual content can be divided into content portions having different change frequencies to make it possible to manage different content portions by a plurality of computing devices having different proximities to a user.

Figure 5:
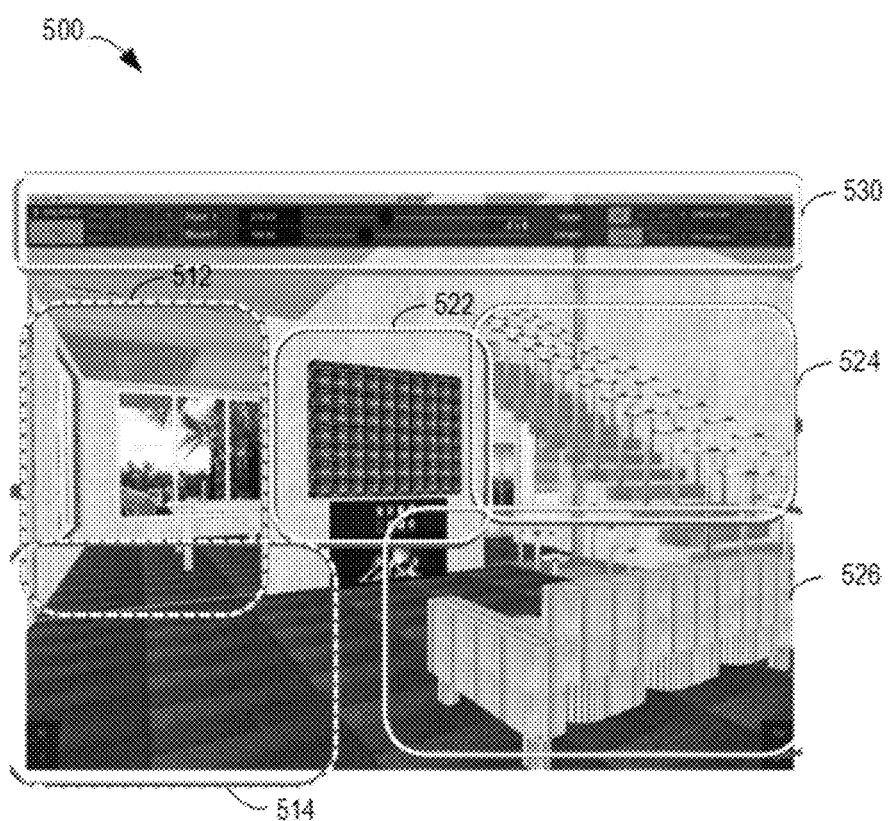
FIG. 5 shows a schematic diagram of virtual visual content suitable for an embodiment of the present disclosure.

FIG. 5 shows schematic diagram 500 of virtual visual content suitable for an embodiment of the present disclosure. FIG. 5 shows virtual visual content used for indoor home design. People can use a content viewing device to walk in an empty room, and then put different furniture, decoration, or other items into the room to view virtual effects to evaluate different home designs.

In the embodiments of the present disclosure, visual content management device 110 may determine a static content portion, for example, the structure of a room such as walls, doors, or windows from the virtual visual content, as shown in blocks 512 and 514. These content portions do not change, or only change once (for example, the color of wallpaper changes), or the change frequency is very low (for example, lighting conditions or outdoor weather conditions change slowly). Visual content management device 110 may transmit the determined static content portions to a cloud computing device, so that these static content portions are processed and drawn by the cloud computing device.

Visual content management device 110 may also determine a dynamic content portion from the virtual visual content, that is, foreground objects, such as chairs, tables, and other furniture, as shown in blocks 522, 524, and 526. These foreground objects may be placed in different positions. Visual content management device 110 may transmit these foreground objects to an edge server closer to the user than the cloud computing device, so that the edge server processes and draws the shape and appearance of these foreground objects in the environment to reduce delay.

Visual content management device 110 may also determine a user interface selection area that interacts with the user most frequently from the virtual visual content, as shown in block 530. For such a user interface selection area, visual content management device 110 may transmit it to user equipment, so that the user equipment directly processes a received user input to reduce the delay.

Figure 6:
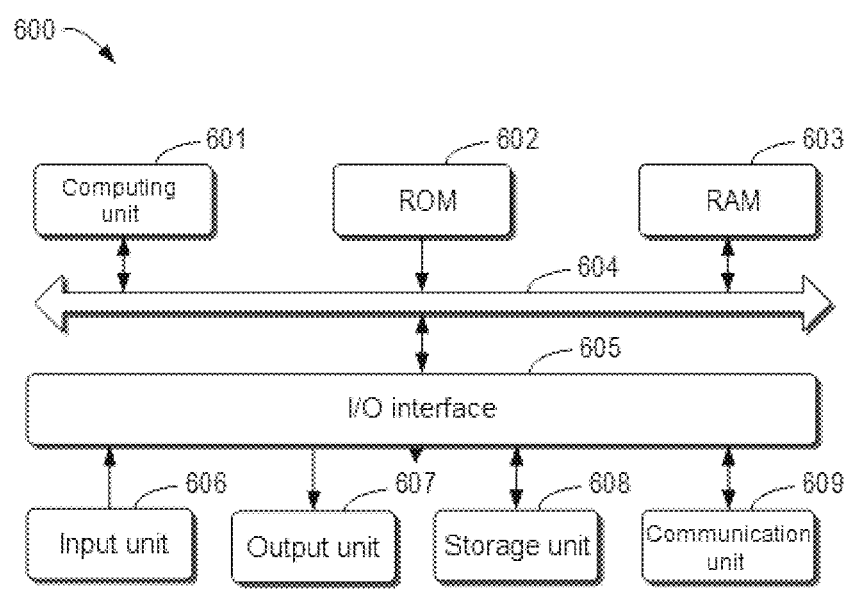
FIG. 6 shows a schematic block diagram of an example device that may be configured to implement an embodiment of the present disclosure.

FIG. 6 shows a schematic block diagram of example device 600 that may be configured to implement an embodiment of the present disclosure. For example, visual content management device 110 as shown in FIG. 1 may be implemented by device 600. As shown in FIG. 6, device 600 includes computing unit 601, illustratively a central processing unit (CPU), which may execute various appropriate actions and processing in accordance with computer program instructions stored in read-only memory (ROM) 602 or computer program instructions loaded from storage unit 608 onto random access memory (RAM) 603. In RAM 603, various programs and data required for the operation of device 600 may also be stored. Computing unit 601, ROM 602, and RAM 603 are connected to one another through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disk; and communication unit 609, such as a network card, a modem, and a wireless communication transceiver. Communication unit 609 allows device 600 to exchange information/data with other devices over a computer network such as the Internet and/or various telecommunication networks.

The various processes and processing described above, such as methods 200 and 300, may be performed by computing unit 601. For example, in some embodiments, methods 200 and 300 may be implemented as a computer software program that is tangibly included in a machine-readable medium such as storage unit 608. In some embodiments, part or all of the computer program may be loaded and/or installed onto device 600 via ROM 602 and/or communication unit 609. When the computer program is loaded to RAM 603 and executed by computing unit 601, one or more actions of methods 200 and 300 described above may be executed.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions for use by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk drive, RAM, ROM, an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device such as a punch card or a raised structure in a groove having instructions stored thereon, and any suitable combination thereof. The computer-readable storage medium used here is not construed as transient signals per se, such as radio waves or other freely propagating electromagnetic waves, electromagnetic waves propagating through waveguides or other transfer media (for example, optical pulses through fiber-optic cables), or electrical signals transmitted through electrical wires.

The computer-readable program instructions described herein may be downloaded from a computer-readable storage medium to various computing/processing devices, or downloaded to an external computer or external storage device via a network such as the Internet, a local area network, a wide area network, and/or a wireless network. The network may include copper transmission cables, optical fiber transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages. The programming languages include object-oriented programming languages such as Smalltalk and C++ and conventional procedural programming languages such as "C" language or similar programming languages. The computer-readable program instructions may be executed entirely on a user computer, partly on a user computer, as a standalone software package, partly on a user computer and partly on a remote computer, or entirely on a remote computer or a server. In the case where a remote computer is involved, the remote computer may be connected to a user computer over any kind of networks, including a local area network (LAN) or a wide area network (WAN), or may be connected to an external computer (e.g., connected over the Internet using an Internet service provider). In some embodiments, an electronic circuit, such as a programmable logic circuit, a field-programmable gate array (FPGA), or a programmable logic array (PLA), is customized by utilizing state information of the computer-readable program instructions. The electronic circuit may execute the computer-readable program instructions so as to implement various aspects of the present disclosure.

Various aspects of the present disclosure are described here with reference to flowcharts and/or block diagrams of the methods, the apparatuses (systems), and the computer program products according to the embodiments of the present disclosure. It should be understood that each block in the flowcharts and/or block diagrams as well as a combination of blocks in the flowcharts and/or block diagrams may be implemented by using computer-readable program instructions.

The computer-readable program instructions may be provided to a processing apparatus of a general purpose computer, a special purpose computer, or another programmable data processing apparatus to produce a machine, such that the instructions, when executed by the processing apparatus of the computer or another programmable data processing apparatus, generate an apparatus for implementing the functions/actions specified in one or more blocks in the flowcharts and/or block diagrams. The computer-readable program instructions may also be stored in a computer-readable storage medium. These instructions cause a computer, a programmable data processing apparatus, and/or another device to operate in a particular manner, such that the computer-readable medium storing the instructions includes an article of manufacture that includes instructions for implementing various aspects of the functions/actions specified in one or more blocks in the flowcharts and/or block diagrams.

The computer-readable program instructions may also be loaded onto a computer, other programmable data processing apparatuses, or other devices, so that a series of operating steps are performed on the computer, other programmable data processing apparatuses, or other devices to produce a computer-implemented process, so that the instructions executed on the computer, other programmable data processing apparatuses, or other devices implement the functions/actions specified in one or more blocks in the flowcharts and/or block diagrams.

The flowcharts and block diagrams in the accompanying drawings show the architectures, functionalities, and operations of possible implementations of the system, the method, and the computer program product according to multiple embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, the functions marked in the blocks may also occur in an order different from that marked in the accompanying drawings. For example, two successive blocks may actually be executed in parallel substantially, or they may be executed in an opposite order sometimes, depending on the functions involved. It should be further noted that each block in the block diagrams and/or flowcharts as well as a combination of blocks in the block diagrams and/or flowcharts may be implemented by using a special hardware-based system for executing specified functions or actions or by a combination of special hardware and computer instructions.

The embodiments of the present disclosure have been described above. The above description is illustrative, rather than exhaustive, and is not limited to the disclosed embodiments. Numerous modifications and alterations are apparent to those of ordinary skill in the art without departing from the scope and spirit of the illustrated various embodiments. The selection of terms as used herein is intended to best explain the principles and practical applications of the various embodiments or technical improvements to technologies on the market, and to otherwise enable persons of ordinary skill in the art to understand the various embodiments disclosed herein.

What is claimed is:

1. A method for managing virtual visual content, comprising:

determining content portions from virtual visual content to be interacted with a user, the content portions having different change frequencies; and transmitting content portions to respective computing devices, at least some of the computing devices having different proximities to the user;

wherein transmitting the content portions is determined based on at least the change frequencies of the virtual visual content and on proximities of the respective computing devices to the user; and wherein transmitting the content portions to the respective computing devices comprises transmitting a first content portion in the content portions to a first computing device, and transmitting a second content portion in the content portions to a second computing device, the change frequency of the second content portion being higher than the change frequency of the first content portion, and the proximity of the second computing device to the user being relatively closer to the user than the proximity of the first computing device to the user.

2. The method according to claim 1, wherein determining the content portions from the virtual visual content comprises:

determining a static content portion and a dynamic content portion from the virtual visual content, the change frequency of the dynamic content portion being higher than that of the static content portion.

3. The method according to claim 2, wherein determining the static content portion and the dynamic content portion from the virtual visual content comprises:

determining the first content portion and the second content portion from the virtual visual content by applying at least one of background subtraction, motion detection, and object detection to the virtual visual content; and determining the first content portion and the second content portion as the static content portion and the dynamic content portion, respectively.

4. The method according to claim 2, wherein determining the content portions from the virtual visual content further comprises:

determining a first dynamic content portion and a second dynamic content portion from the dynamic content portion, the change frequency of the second dynamic content portion being higher than that of the first dynamic content portion.

5. The method according to claim 4, wherein determining the first dynamic content portion and the second dynamic content portion from the dynamic content portion comprises:

determining change frequency statistics on the dynamic content portion; and dividing the dynamic content portion into the first dynamic content portion and the second dynamic content portion based on the statistics.

6. The method according to claim 4, wherein determining the first dynamic content portion and the second dynamic content portion from the dynamic content portion comprises:

obtaining a visual focus area of the user, the visual focus area being determined based on motion information of a time when the user interacts with historical visual content, the motion information being obtained from a viewing device worn by the user when viewing the historical visual content; and determining a content portion corresponding to the visual focus area in the dynamic content portion as the second dynamic content portion.

7. The method according to claim 6, wherein the motion information comprises at least one of the following: eyeball motion information and head motion information.

8. The method according to claim 1, wherein the respective computing devices comprise at least one of the following: an augmented reality/virtual reality content viewing device, an edge server, and a cloud computing device.

9. An electronic device, comprising:

at least one processing unit; and at least one memory coupled to the at least one processing unit and storing instructions configured to be executed by the at least one processing unit, wherein the instructions, when executed by the at least one processing unit, cause the device to perform actions comprising:

determining content portions from virtual visual content to be interacted with a user, the content portions having different change frequencies; and transmitting the content portions to respective computing devices, at least some of the computing devices having different proximities to the user;

wherein transmitting the content portions is determined based on at least the change frequencies of the virtual visual content and on proximities of the respective computing devices to the user; and wherein transmitting the content portions to the respective computing devices comprises transmitting a first content portion in the content portions to a first computing device, and transmitting a second content portion in the content portions to a second computing device, the change frequency of the second content portion being higher than the change frequency of the first content portion, and the proximity of the second computing device to the user being relatively closer to the user than the proximity of the first computing device to the user.

10. The device according to claim 9, wherein determining the content portions from the virtual visual content comprises:

determining a static content portion and a dynamic content portion from the virtual visual content, the change frequency of the dynamic content portion being higher than that of the static content portion.

11. The device according to claim 10, wherein determining the static content portion and the dynamic content portion from the virtual visual content comprises:

determining the first content portion and the second content portion from the virtual visual content by applying at least one of background subtraction, motion detection, and object detection to the virtual visual content; and determining the first content portion and the second content portion as the static content portion and the dynamic content portion, respectively.

12. The device according to claim 10, wherein determining the content portions from the virtual visual content further comprises:

determining a first dynamic content portion and a second dynamic content portion from the dynamic content portion, the change frequency of the second dynamic content portion being higher than that of the first dynamic content portion.

13. The device according to claim 12, wherein determining the first dynamic content portion and the second dynamic content portion from the dynamic content portion comprises:

determining change frequency statistics on the dynamic content portion; and dividing the dynamic content portion into the first dynamic content portion and the second dynamic content portion based on the statistics.

14. The device according to claim 12, wherein determining the first dynamic content portion and the second dynamic content portion from the dynamic content portion comprises:
   obtaining a visual focus area of the user, the visual focus area being determined based on motion information of a time when the user interacts with historical visual content, the motion information being obtained from a viewing device worn by the user when viewing the historical visual content; and
   determining a content portion corresponding to the visual focus area in the dynamic content portion as the second dynamic content portion.

15. The device according to claim 14, wherein the motion information comprises at least one of the following: eyeball motion information and head motion information.

16. The device according to claim 9, wherein the respective computing devices comprise at least one of the following: an augmented reality/virtual reality content viewing device, an edge server, and a cloud computing device.

17. A computer program product tangibly stored in a non-transitory computer storage medium and comprising machine-executable instructions, wherein the machine-executable instructions, when executed by a device, cause the device to execute a method for managing virtual visual content, the method comprising:
   determining content portions from virtual visual content to be interacted with a user, the content portions having different change frequencies; and
   transmitting the content portions to respective computing devices, at least some of the computing devices having different proximities to the user;
   wherein transmitting the content portions is determined based on at least the change frequencies of the virtual visual content and on proximities of the respective computing devices to the user; and
   wherein transmitting the content portions to the respective computing devices comprises transmitting a first content portion in the content portions to a first computing device, and transmitting a second content portion in the content portions to a second computing device, the change frequency of the second content portion being higher than the change frequency of the first content portion, and the proximity of the second computing device to the user being relatively closer to the user than the proximity of the first computing device to the user.

18. The computer program product according to claim 17, wherein determining the content portions from the virtual visual content comprises:
   determining a static content portion and a dynamic content portion from the virtual visual content, the change frequency of the dynamic content portion being higher than that of the static content portion.

19. The computer program product according to claim 18, wherein determining the static content portion and the dynamic content portion from the virtual visual content comprises:
   determining the first content portion and the second content portion from the virtual visual content by applying at least one of background subtraction, motion detection, and object detection to the virtual visual content; and
   determining the first content portion and the second content portion as the static content portion and the dynamic content portion, respectively.

20. The computer program product according to claim 18, wherein determining the content portions from the virtual visual content further comprises:
   determining a first dynamic content portion and a second dynamic content portion from the dynamic content portion, the change frequency of the second dynamic content portion being higher than that of the first dynamic content portion.

* * * * *